United States Patent [19]

Mantellina et al.

[11] Patent Number: 4,592,011
[45] Date of Patent: May 27, 1986

[54] MEMORY MAPPING METHOD IN A DATA PROCESSING SYSTEM

[75] Inventors: Calogero Mantellina, Cerro Maggiore; Roberto Trivella, Monza; Andrea Quadraruopolo, Rho, all of Italy

[73] Assignee: Honeywell Information Systems Italia, Milan, Italy

[21] Appl. No.: 547,268

[22] Filed: Oct. 31, 1983

[30] Foreign Application Priority Data

Nov. 4, 1982 [IT] Italy .............................. 24060 A/82

[51] Int. Cl.⁴ .......................................... G06F 12/02
[52] U.S. Cl. .................................... 364/900
[58] Field of Search ... 364/200 MS File, 900 MS File

[56] References Cited

U.S. PATENT DOCUMENTS

| | | | |
|---|---|---|---|
| 3,800,289 | 3/1974 | Batcher | 364/200 |
| 3,800,292 | 3/1974 | Curley et al. | 364/200 |
| 3,840,863 | 10/1974 | Fuqua et al. | 364/200 |
| 4,025,903 | 5/1977 | Kaufman et al. | 364/200 |
| 4,214,303 | 7/1980 | Joyce et al. | 364/200 |

Primary Examiner—Harvey E. Springborn
Attorney, Agent, or Firm—Nicholas Prasinos; John S. Solakian

[57] ABSTRACT

In a data processing system wherein a memory is comprised of an unknown plurality of memory blocks of a basic capacity, arranged in an unknown plurality of modules which have an unknown capacity multiple of the basic capacity, a method addresses the memory location which involves the selection of the module containing such locations by use of a directory having a plurality of addressable locations. The initial loading of the directory with codes corresponding to the real constituent of the memory is performed by writing into the directory locations a binary code assigning the related memory blocks to a hypothetical first module, writing test codes into memory locations each belonging to a different block, reading out the contents of the same memory locations and comparing such contents with the test codes to determine if a first module is present and if such memory locations and the pertaining blocks belong to the first module, writing into the directory locations whose related memory block do not belong to the first module a binary code assigning the related memory blocks to a hypothetical second module, writing test codes into memory locations each belonging to a different block assigned to the second module, reading out the contents of the same memory locations and comparing such contents with the test codes to determine if a second module is present and if such memory locations and related memory blocks belong to the second module, and repeating the above operations for further subsequent modules.

1 Claim, 8 Drawing Figures

MEMORY MAPPING METHOD IN A DATA PROCESSING SYSTEM

BACKGROUND OF THE INVENTION

1. Field of the Invention

The present invention relates to a memory mapping method in a data processing system.

2. Description of the Prior Art

Most data processing systems presently used provide the opportunity for increasing the capacity of the working memory in order to fulfill new requirements. This is commonly attained by arranging the working memory modularly; that is, by having a variable number of identical memory modules housed into a unit which is designed to contain a certain maximum number of modules. A memory module has a predetermined capacity (for instance 128K bytes) and is implemented with printed circuit boards of predetermined sizes and by a denoted number of standard integrated memory components. Because of rapid changes in technology, the manufacturers of data processing systems are faced with the problem of upgrading the working memory at minimum cost. Because of such progress in new integrated memory components which have greater and greater capacity, a memory module may be built which has a greater capacity than it had (for instance double or quadruple) while at the same time maintaining the size of its memory board unchanged. Thus the capacity of a working memory may be increased not only by increasing the number of memory modules, but also by utilizing memory modules of greater capacity. Moreover it is unnecessary to remove the smaller capacity modules already installed. In such a way it is possible to obtain a working memory with a capacity variable as a function of the number and type of modules, and in which modules of different capacity are present at the same time. However there is a problem in addressing such memories. Predetermined circuits are required that can address any of several modules of the working memory so that the several modules may be addressed as if they constitute an addressable continuous space of one memory only. Because in data processing systems processors, working memories and peripheral units are all interconnected via busses which define a common interface for several types of equipments, it is not possible to perform the required address conversion outside the working memory without affecting the interfaces of all the equipment. Such conversion must therefore occur within the working memory and must be performed with simple and fast circuits so as not to introduce unacceptable delays in the memory access times and further increase the complexity and the related cost of such circuits. A partial solution to this problem is described in U.S. Pat. No. 4,001,786. The circuit solution proposed by such patent is partial since it is relatively slow and requires a considerable number of hardware components, thus resulting in a complex and expensive memory. Another U.S. Patent Application Ser. No. 422,772, filed by the same Applicant on Sept. 24, 1982 (or the corresponding European Patent Application No. 82110396.7 published with No. 0080626 on June 8, 1983) describes a memory module selection apparatus which uses a logical selection network simpler and faster than the one described in the mentioned U.S. patent. In fact certain processing functions are installed on the central unit, which performs them once and for all during the initialization phase. In particular the modular memory sends to the central unit some information about the capacity of its constituent modules. The central unit processes such information and provides the memory with a set of information representative of the capacity of the first module, of the sum of the capacity of the first and second module, of the sum of the capacity of the first, second and third module, and so on for the total memory capacity. This information set is loaded into suitable registers of the module selection apparatus included into the memory. When the memory is addressed, a meaningful portion of the address is simultaneously compared, by several comparators, with the content of the several registers. The signals representative of the results of the several comparisons are applied to a decoder which selects one of the several memory modules. However the above-mentioned module selection apparatus still comprises registers, comparison circuits and a decoder and therefore is relatively complex and slow. These disadvantages are overcome by the present invention which allows the use of a smaller number of hardware components still keeping to a minimum the module selection delays.

OBJECTS OF THE INVENTION

It is an object of the invention therefore to provide an improved memory mapping method in a data processing system.

Another object of the invention is to provide a memory mapping method suitable for use with passive memories.

Still another object of the invention is to reconfigure the memory at the initialization stage.

These and other objects of the invention will become obvious upon a reading of the specification together with the drawings.

SUMMARY OF THE INVENTION

Such advantages are obtained by providing the system central unit with suitable processing functions, such as the computation of the capacity of each memory module included in the memory, and by using an auxiliary read/write selection memory or directory loaded by the same central unit of the system. The auxiliary memory, once loaded, acts as address translator; that is, produces a module selection signal from an absolute memory address. Each memory module can be considered as comprised of a certain number of ordered memory blocks having a predetermined basic capacity, for instance 64K words; that is, each memory module may have a capacity equal to or a multiple of 64K words. Therefore the memory, physically comprised of modules, can be considered as ideally including an ordered plurality of M memory blocks. The auxiliary memory or directory has a number of memory locations at least equal to the maximum number of memory blocks which may constitute the working memory. In such a way each memory block is associated to one directory location. The memory blocks are shared among the several possible memory modules, each module being able to contain at the most N blocks. A memory address is comprised of a suitable number of bits. The less significant bits, for example 16 bits in case of memory blocks with a capacity of 64K words, allow the identification of an address within a block. A portion of the most significant bits permits the identification of the memory block which the address relates to. Additionally the most significant bits are used to address the directory location wherein coded information representative of the module containing the specified memory block is stored. Therefore such coded information allows the selection of the suitable memory module during the addressing operations of the system memory. The loading operations of the directory with the information relating to the modules containing the memory blocks are executed by the central unit at the initialization or the reconfiguration of the system according to a method which comprises an object of the present invention. With regard to such method, the central unit loads the directory locations corresponding to the several memory blocks with a coded information selecting a first module J. Then the central unit addresses, through the auxiliary memory or directory, a predetermined location of each of the memory blocks and, by means of writing, reading and comparison operations, verifies the relationship of each block to module J. If the blocks, in whole or in part, do not belong to module J, the central unit executes some operations similar to the ones previously described and checks if such blocks belong to module J+1, and so on.

BRIEF DESCRIPTION OF THE DRAWINGS

These and other features will appear clearer from the following description of a preferred embodiment of the invention and from the enclosed drawings where.

DETAILED DESCRIPTION OF THE PREFERRED EMBODIMENT

Figure 1:
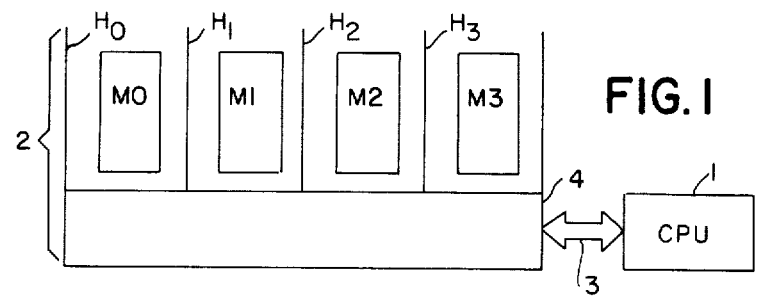
FIG. 1 is a schematic block diagram of a data processing system wherein the method of the invention is used.

Referring to FIG. 1 there is shown a central processing unit 1 and a working memory 2 interconnected through a channel 3 comprised of a plurality of leads. Through channel 3, central unit 1 sends to memory 2 timing signals, commands, addresses, data to be written therein and receives from memory 2 read data and status information. Central unit 1 is provided with a microprogrammed control unit, an operative unit, a plurality of working registers and a suitable interface with channel 3. For purposes of the invention any additional information about central unit 1 and channel 3 is unnecessary because the invention may be used with every type of central unit and interconnecting channel.

Figure 2:
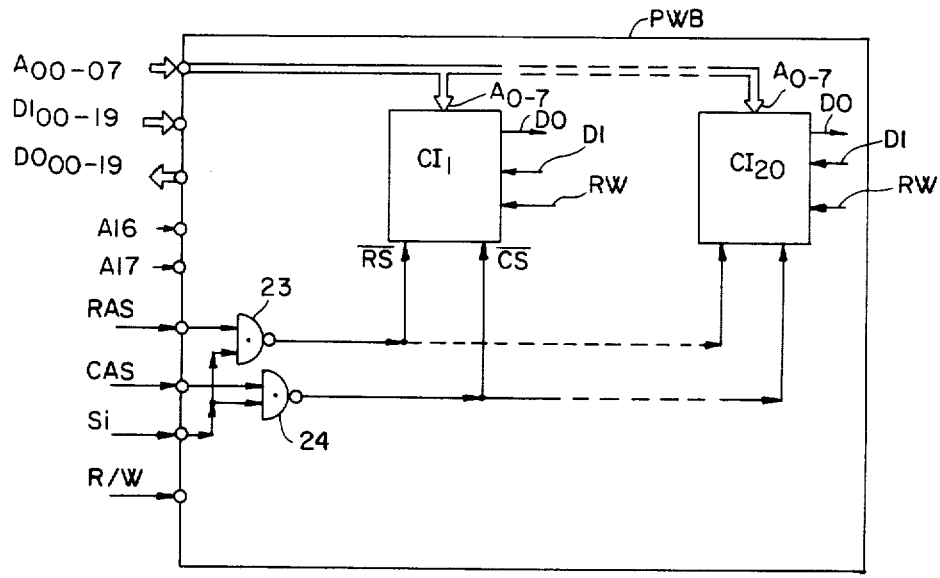
FIGS. 2 and 3 show the wiring diagram of different capacity memory modules which are used in the system of FIG. 1.
Figure 3:
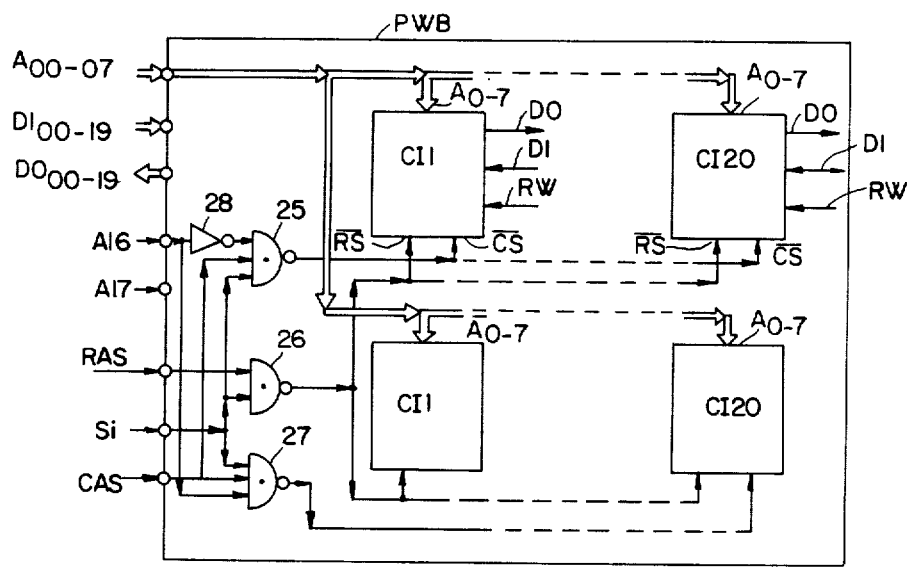

Working memory 2 includes an interface and module selection unit 4 and a plurality of memory modules which may be installed in variable number from 1 to a maximum of 4 (MO, M1, M2, M3) into corresponding ordered housings (H0, H1, H2, H3) of the memory structure. FIGS. 2 and 3 show some examples of possible embodiments of different capacity memory modules. FIG. 2 shows a memory module of capacity 64K words. It is comprised of a printed circuit board PWB on which twenty integrated memory circuits CI1, . . . CI20 are arranged to form a row. In other words for purposes of discussion an assumption is made that the memory parallelism be of 20 bits, of which 16 bits are used as information bits and 4 bits are redundant bits and check and error correction. Each integrated circuit $CI_n$ may be of a type having a capacity of 64K bits. Such memories are available on the market (for instance circuit HM 4864-2 manufactured by Hitachi) and requires 16 addressing bits. It is provided with a data input DI, a data output DO, timing and command inputs $\overline{RS}$ and $\overline{CS}$, a read/write command input R/W and 8 addressing inputs A0–7. The memory addressing is executed according to the well known multiplexing method in two subsequent phases. As memory cells inside the integrated circuit are ideally arranged according to a matrix of 256 rows and 256 columns, the addressing of a cell is performed by first selecting a matrix row with an 8-bit code validated by command $\overline{RS}$ and then a matrix column with an 8-bit code validated by command $\overline{CS}$. Besides the memory the integrated circuit is provided with an input A8 not used. The memory operation which is executed is a read or write operation according to the logic level of the signal applied to input R/W of the integrated circuit. Output DO of the memory integrated circuit is of a tristate type. Such output, is normally held in a high impedance state, and goes to logic level 1 or 0, according to the information stored into the selected cell, during the read operations and then for a pre-established time interval after command $\overline{CS}$ has been received. (Additional information about such memory integrated circuits may be found in the manufacturers' data books.)

The interface connecting the module of FIG. 2 to unit 4 of FIG. 1 is very simple and comprises:

a set DI 00–19 of 20 pins for sending data to the module, a set DO 00–19 of 20 pins for receiving data from the module, two pins RAS, CAS for sending commands $\overline{RS}$, $\overline{CS}$ to the module, a pin R/W for sending a homonymous command to the module, a pin Si for sending a selection command to the module, a set of 8 pins A 00–07 for sending row and column addresses to the module.

(The connections between pins DI 00–19 (DO 00–19) and inputs DI (DO) of the several integrated circuits are not shown for drawing simplicity and clearness and also because they are obvious.)

FIG. 2 shows that the transfer of signals $\overline{RS}$, $\overline{CS}$ from pins RAS, CAS to the corresponding inputs of the module integrated circuits is conditioned by two logic gates 23, 24 enabled by the signal present on module selection pin Si. The module interface is provided with two additional pins A16, A17 which are not used in the module of FIG. 2. In fact the printed circuit board of the memory module may be arranged to contain two rows of integrated circuits of the same type previously described. In such case the memory module capacity is 128K words. Therefore it is essential to have a further addressing bit which is transferred through one of the two additional pins, for instance pin A16.

FIG. 3 schematically shows a module of 128K word capacity obtained by arranging the printed circuit board in two rows of memory integrated circuits. In this case the logic signal on pin A16 is applied, through a NOT gate 28, to an input of a 3-input NAND gate 25. Output of NAND gate 25 is coupled to inputs $\overline{CS}$ of the integrated circuits of the first row. The logic signal on pin A16 is applied to an input of a second 3-input NAND gate 27. Output of NAND gate 27 is coupled to inputs $\overline{CS}$ of the integrated circuits of the second row. The other two inputs of both NAND gates 25 and 27 are respectively connected to pins Si and CAS. Pins Si and RAS are also connected to the inputs of a NAND gate 26 whose output is coupled to inputs $\overline{RS}$ of the integrated circuits of both the first and second row. By means of such selection circuit the signal on pin A16 permits selection during the read/write operations of one of the two rows of integrated circuits. Moreover memory integrated circuits with capacity 128K bits are available commercially. Such circuits differ from the previous ones only because addressing input A8 is used to select one of two sets of 256 columns inside the integrated circuit. It is therefore clear that in the modules of FIGS. 2 and 3 one of two rows of such integrated circuits may be respectively installed so as to obtain a module of 128K word capacity and 256K word capacity respectively. In the first case input A8 of integrated circuits is connected to pin A16 of the printed circuit. In the second case input A8 is connected to pin A17 and the logic circuits selecting the row of integrated circuits remain unchanged. It is to be noted that the memory modules do not provide unit 4 of FIG. 1 with any information about their capacity. It is also to be noted that, if such modules have a capacity less than the possible maximum one of 4 blocks and are selected with signal Si and an address greater than the installed capacity, they neglect the most significant bits of the address, as for instance those applied to inputs A16, A17. This involves erroneous addressing and overwriting operations. Let's assume, for example, that the modules have a capacity of 64K words corresponding to only one memory block and is addressed with a binary code 0 corresponding to the first location of the block in order that information A be written into such location. If the same module is successively addressed with a 17-bit binary code 10000000000000000 corresponding to the location of address 64K in order that an information B be written into such location, the location really addressed is the location of address 0 and information B is written and therefore replaces information A previously stored. This discussion is essential to understand the memory mapping method which will be described infra, but not necessary to the disclosure of the invention. It is to be pointed out that FIGS. 2 and 3 only show some examples of possible embodiments of memory modules.

Figure 4:
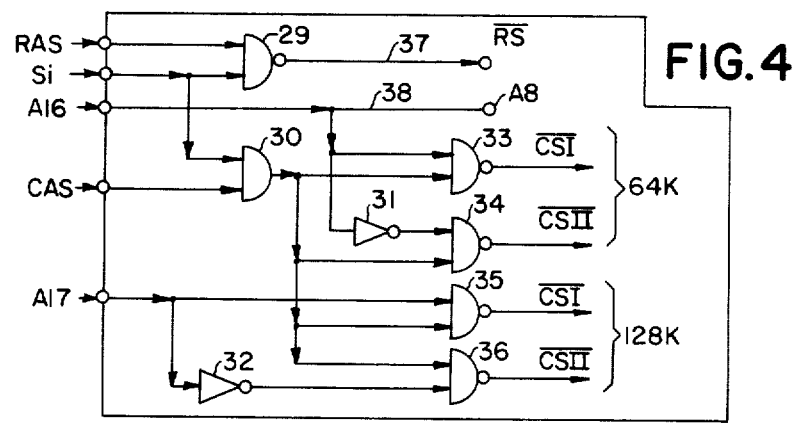
FIG. 4 shows a selection circuit which is used in the system of FIG. 1 inside a memory module.

FIG. 4 shows an embodiment of a circuit which selects a memory block within a module and prevents the information from being overwritten. The selection circuit comprises five 2-input NAND gates 29, 33, 34, 35, 36, a 2-input AND gate 30 and two NOT gates 31, 32. The inputs of NAND gate 29 are respectively connected to pins RAS and Si of the module interfacce. The output of NAND 29 is connected through lead 37 to inputs $\overline{RS}$ of the module integrated circuits. The inputs of AND gate 30 are respectively connected to pins Si and CAS of the module interface. The output of AND gate 30 is connected to an input of each of NAND gates 33, 34, 35, 36. Pin A16 is connected to an input of NAND gate 33 and, through NOT gate 31, to an input of NAND gate 34. In case the memory module is comprised of integrated circuits with 128K bit capacity, pin A16 is further connected, through lead 38, to pin A8 of such integrated circuits. Pin A17 is connected to an input of NAND gate 35 and, through NOT gate 32, to an input of NAND gate 36. Output of NAND gates 33, 34 provides respectively signals $\overline{CSI}$ and $\overline{CSII}$ which are used as column strobes $\overline{CS}$ respectively for the first and the second row of integrated circuits of capacity 64K bits possibly installed in the module. Outputs of NAND gates 35, 36 provide respectively signals $\overline{CSI}$ and $\overline{CSII}$ which are used as column strobes $\overline{CS}$ respectively for the first and second row of 128K bit integrated circuit capacity which may be installed in the module. By use of such a selection circuit, command $\overline{CS}$, sent to the several integrated circuits, is conditioned by the addressing code. If the memory addressing code exceeds the capacity of the module, the installed integrated circuits do not receive command $\overline{CS}$ and therefore the memory operation is not performed; that is, overwriting is avoided. The capacity of each of the memory modules may therefore be chosen among several values; that is, 64K words, 128K words, 256K words. It is clear that, according to the number and the capacity of the installed modules, the total memory capacity may vary from 64K to 1M words for multiples of 64K words, with the only exception of 960K words. Each memory module of capacity greater than 64K; that is, 128K and 256K, may be considered as comprised respectively of two and four memory blocks of basic capacity 64K. In this manner the memory may be considered as comprised of a plurality of blocks shared among several modules. The binary addressing of a word within a memory space comprised of 1M words requires 20 bits. Central unit 1 can therefore address a word stored into memory 2 with a binary code of 20 bits A 00–19. The 4 most significant bits of such 20 bits; that is, bits A16–,9, are used to specify one of the possible 16 memory blocks of 64K words, while the 16 less significant bits A00–15 are used to address a word within the specified block. As a memory module may contain 4 blocks of 64K words, each module must receive 18 addressing bits A 00–17.

Figure 5:
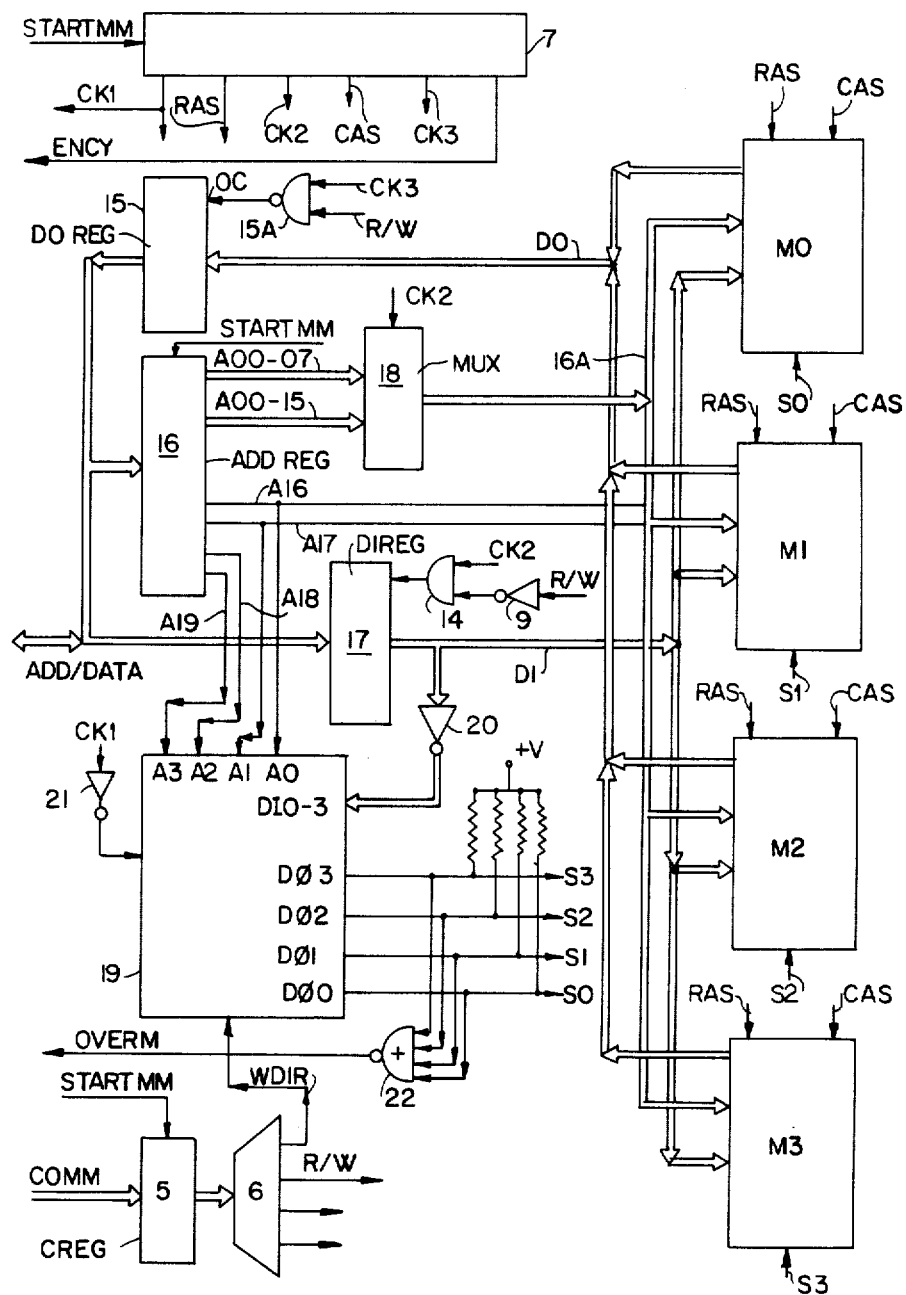
FIG. 5 shows, in detail, an interface and module selection unit of the system of FIG. 1.

FIG. 5 shows in greater detail the working memory 2 and, more particularly, module selection and interface unit 4. Unit 4 receives through channel 3 a suitable information set. Channel 3 comprises a plurality of leads as follows:

a lead for transferring a signal START MM sent by the central unit to the memory in order to command the start of a memory cycle;

a set of bidirectional leads ADD/DATA for transferring to and from memory information which may be addresses/data. Contemporaneously with the generation of command START MM, the central unit applies on leads ADD/DATA a binary code representative of the memory location to be addressed:

a lead for transferring a signal CK1 sent by unit 4 to the central unit in order to communicate to it that the information representative of the memory address can be removed from leads ADD/DATA. When the central unit receives signal CK1, it applies on leads ADD-/DATA, in case of a memory writing operation, some information representative of the datum to be written into memory; or in the case of a memory reading operation, it prepares itself for receiving from leads ADD-/DATA information read out from memory;

a lead for transferring a signal ENCY sent by unit 4 to the central unit in order to communicate to it the end of a memory cycle;

a set of leads COMM for sending from the central unit to the memory a set of commands representative of the type of memory operation to be executed;

a lead for transferring a signal OVERM sent by unit 4 to the central unit in order to notify it that the supplied memory address is greater than the capacity of the installed memory.

The set of leads COMM is coupled to the inputs of a register CREG 5 which receives an input signal START MM. When signal START MM is raised to logic level 1, the information present on leads COMM is loaded into register CREG 5 and is therefore available at its output terminals; this occurs also when START MM falls again to logic level 0. Outputs of register CREG 5 are connected to the input terminals of a decoder 6 which generates on it outputs command signals used for both controlling the circuits of unit 4 and commanding read/write operations into memory modules.

Unit 4 comprises a timing unit 7 which receives at its enabling input terminal a signal START MM. Timing unit 7 provides on its output terminal, besides signals CK1 and ENCY already seen, also signals RAS, CK2, CAS, CK3. Timing unit 7 is implemented in several ways; they are known to persons skilled in the art and are unessential for the purposes of this invention. Any description of timing unit 7 is therefore omitted.

In order to better understand unit 4, only the function of the several timing signals is described. Neglecting signals CK1, ENCY already considered, the meaning of signals RAS, CK2, CAS, CK3 is as follows:

RAS is a timing and command signal sent to the integrated circuits comprising the system memory through the pin of the memory modules (FIGS. 2 and 3);

CK2 is a signal which, when active, permits removal from the memory module addressing channel the row address and replaces it with the matrix column address. Additionally such signal, when active, allows during a memory writing operation placing in the memory input data-channel the information related to the datum to be written.

CK3 is a signal which, when active, permits, during a memory reading operation, placing on channel 3 communicating between central unit 1 and memory 2, the datum read out from memory.

Figure 6:
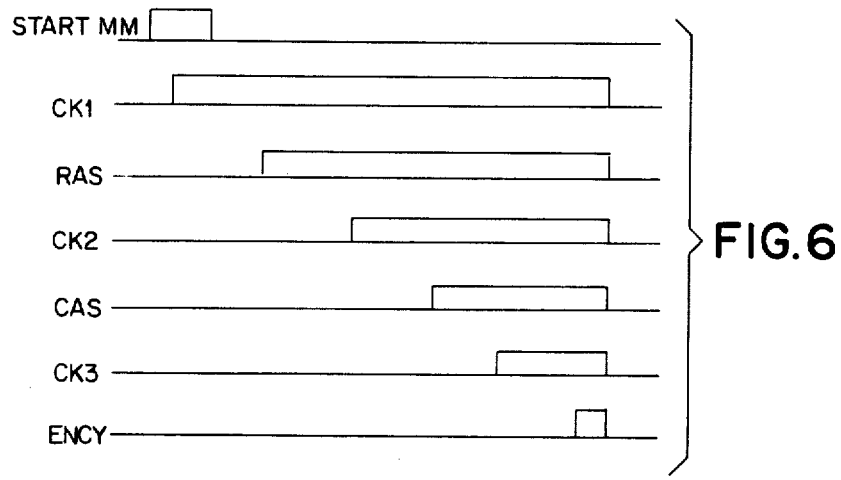
FIG. 6 shows a timing diagram of some important timing signals used by the unit of FIG. 5.

FIG. 6 qualitatively illustrates the timing diagram of signals START MM, CK1, RAS, CK2, CAS CK3, ENCY.

Considering again FIG. 5, the set of bidirectional leads ADD/DATA is coupled to the outputs of a register DOREG 15 (for instance of the type marked as type 74S374). The inputs of register DOREG 15 are connected to channel DO of data output from the several memory modules MO, . . . M3. Output control pin OC of register DOREG 15 is connected to the output of a NAND gate 15A which receives at its input terminal signals CK3 and signal R/W coming from an output of decoder 6 and indicate when at logic level 1 (0) a memory read (write) operation. When output of NAND gate 15A is at logic level 1, outputs of register DOREG 15 are in a high impedance state; when on the other hand output of NAND gate 15A is at logic level 0, information present on the input terminals of register 15 is available on its output terminals. The set of bidirectional leads ADD/DATA is further coupled to the inputs of a register ADD REG 16 which receives at its enabling input signal START MM. When START MM rises to logic level 1, the information present on leads ADD/DATA; that is, the memory address, is loaded into register ADD REG 16 and is available on its output terminals even when START MM falls to logic level 0. Bidirectional leads ADD/DATA are further connected to the inputs of a register DI REG 17, whose enabling input is coupled to the output of an AND gate 14. AND gate 14 receives at a first input terminal a signal CK2 and at a second input terminal through a NOT gate 19, signal R/W as an output signal from decoder 6. When the signal present on the output of AND gate 14 rises to logic level 1, the information present on leads ADD/DATA is loaded into register DI REG 17 and is available on its output terminals. Output terminals of register 17 are coupled to data input channel DI of the several memory modules. The output terminals of register ADD REG 16 related to address bits A00–07 and A0-8–15 are respectively connected to a first and second input set of a multiplexer 18. The output terminals of multiplexer 18 and the output terminals of register 16 related to address bits A16, A17 are coupled to addressing channel 16A of modules MO, . . . M3. Multiplexer 18 receives at its selection input signal CK2. According to the logic level of signal CK2, multiplexer 18 transfers to its output terminals the information present on one of its two input sets; in particular:

if CK2=0, addressing bits A00–07 are available on multiplexer outputs;

if CK2=1, addressing bits A08–15 are available on multiplexer outputs.

The interface structure described is merely explanatory of the several interface types used in the data processing systems; for the purposes of the present invention any communication interface may be used.

What characterizes unit 4 for the purposes of the present invention is the presence of a fast auxiliary memory or directory 19 having a number of memory locations at least equal to the maximum number of memory blocks of basic capacity 64K words and a parallelism equal to the maximum number of foreseeable modules. In the preferred embodiment of the invention, as the maximum number of foreseeable modules is 4 and the maximum number of memory blocks of capacity 64K words is 16 (that is 4 memory blocks for each module at the maximum), the auxiliary memory 19 has 16 memory locations with parallelism 4 bits. For instance the 16×4 bit memory circuit marketed as type 74F189 by Fairchild Company and with typical access time of 20 nsec may be used. Such a memory circuit is an inverting type; that is, the information received at its inputs is stored and therefore read out in negated form. Outputs of memory 19 are of the open collector type. Memory 19 is further provided with an enabling input terminal and a read/write control input terminal. Output terminals D0–03 of directory 19 are coupled each to a voltage source +V through a pull-up resistor. A signal CK1, obtained by inverting CK1 through a NOT 21, is applied to enabling input of directory 19. A signal WDIR present on one output of decoder 6 is applied to read/write control input of directory 19. When CK1 and WDIR are at logic level 0, directory 19 is written and its output terminals are at voltage level +V corresponding to logic level 1. When CK1 is at logic level 0 and WDIR is at logical level 1, directory 19 is read and its output terminals assume a logic level depending on the read information. When CK1 is at logic level 1, directory 19 is disabled and its output terminals are at logic level 1. The four data input terminals DI0-3 of directory 19 are coupled to four suitable output terminals of register DI REG 17 through a NOT gate set 20 so that directory 19 and NOT gate set 20 may be considered as a non-inverting directory. For clarity, such a non-inverting directory will be considered in the analysis which will follow.

The four addressing input terminals A0 ... A3 of directory 19 are connected to output terminals A16, A17, A18, A19 of register ADD REG 16; that is, to the output terminals related to the most significant bits of a memory address. Output terminals D0 0-3 of directory 19 are respectively connected to selection pins S0 ... S3 of modules M0 ... M3. Such output terminals are further coupled to the input terminals of a 4-input NOR gate 22. NOR gate 22 generates at its output terminal a signal OVERM at logic level 1 when all the signals present on its input terminals are simultaneously at logic level 0. Signal OVERM is sent to central unit 1 and indicates that the memory address received by unit 4 exceeds the memory capacity. As already seen, modules M0, M1, M2, M3 receive signals R/W, RAS, CAS too.

The working of the module selection apparatus of unit 4 is very simple. During the system initialization or configuration, the central unit, through a method which will be explained more in detail infra and which comprise a major object of the invention, performs a mapping of directory 19. In other words the central unit writes into each location i ($0 \leq i \leq 15$) of directory 19 information which selects module Mj ($0 \leq j \leq 3$) containing the memory block of basic capacity coupled to location i. If for example the working memory includes module M0 of capacity 256K words, module M2 of capacity 128K words and module M4 of capacity 64K words (therefore the total memory capacity is 448K words; that is equal to 7 memory blocks each of 64K words), the content of the several locations of directory 19 is given by the following table:

| directory location | D3 | D2 | D1 | D0 |
|---|---|---|---|---|
| 0-3 | 0 | 0 | 0 | 1 |
| 4-5 | 0 | 1 | 0 | 0 |
| 6 | 1 | 0 | 0 | 0 |
| 7-15 | 0 | 0 | 0 | 0 |

Considering the above table, if for example, the central unit commands a read/write operation at the memory address 300K, the 4 most significant addressing bits address location 4 of directory 19. The information herein stored selects memory module M2 containing the 5th memory block inside which the memory location of address 300K is present. The module activation occurs with timing signal RAS which must have a delay as regards the rising edge of signal CK1 equal to the maximum access time of directory 19. Choosing a very fast memory for a directory (for example the already mentioned RAM 74F189 of Fairchild with typical access time equal to 20 ns), the module selection delay with regard to the time when the row addressing bits are available to the input terminals of the same module may be reduced to a minimum. In addition the circuit structure of the selection network is very simple and inexpensive because all the logic networks of sum, subtraction and comparison, used in the selection networks of the prior art, are abolished, the directory mapping operation being assigned to the central unit and executed once and for all during the system initialization or during a possible memory reconfiguration owing to an addition/removal/substitution of memory modules. Any central unit, provided with an internal control memory or with a program memory however different from the one to be mapped, as well as with a reduced number of working registers which may be also memory locations provided they do not belong to the memory to be mapped, is able to perform the mapping operations of the invention by means of a very simple program or microprogram. Substantially the mapping is performed according to the following method.

As information about the number of installed memory modules and related capacity, as well as about the features of such modules (modules with overwriting for addresses greater than their capacity or modules without overwriting) is missing, the directory is written so as to select a hypothetical first module. Successively memory locations belonging to a hypothetical first, second and third block of the selected module are addressed. Some arbitrary test codes are written into such addressed memory locations and these codes are then read. By checking operations of equality/difference among read/write codes, it is possible to determine the actual presence of a first module and its capacity, and therefore to confirm and maintain the already performed mapping with regard to its valid part. The above operations are then repeated for all the subsequent hypothetical modules. When the associative operations among directory locations and memory modules really installed are completed, a code (all zeros) is written into the possible remaining directory locations. Such code is used to generate signal OVERM when these remaining locations are addressed.

Before describing in detail the flow diagram of a program or microprogram performing the method of the invention, it is suitable to consider the table below which shows the content of the memory locations of a module when some test codes are written

| | Module capacity | | | |
|---|---|---|---|---|
| Address | 0 | 64K | 128K | 256K |
| 0 | == | CA | CA | AA |
| 64K | == | == | BB | BB |
| 128K | == | == | == | CC |

The eight columns of the above table are related to four hypothetical memory module capacities; that is, respective 0 (missing module), 64K, 128K, 256K. The three rows of the above table are related to three writing addresses; that is, respectively 0 (first module location), 64K (first location exceeding the capacity of a memory block) and 128K (first location exceeding the capacity of 2 memory blocks). Addresses 0, 64K, 128K are represented by a binary code whose bits A00-15 are all zeros and bits A17, A16 are respectively 00 for address 0, 01 for address 64K, 10 for address 128K. During a first phase the mapping method provides for writing into a hypothetical module a test code A at address 0, also a test code B at address 64K, and a test code C at address 128K. After these operations, the content of the module locations of address 0, 64K 128K respectively will be as follows. If the module is missing; that is its capacity is 0, all the memory locations are missing and therefore no information is stored. If the module has capacity 64K and is such that overwriting occurs, only location of address 0 is involved in the writing operations and the content of it is C. But if the module of capacity 64K is such that overwriting does not occur, the content of location of address 0 is A. If the module has a capacity of 128K and is such that overwriting occurs, only locations of addresses 0, 64K are involved in the writing operations and the content of them is C, B respectively. But if the module of capacity 128K is such that overwriting does not occur, the content of locations of addresses 0, 64K is A, B respectively. If the module has a capacity of 256K, the content of locations of addresses 0, 64K, 128K is A, B, C respectively.

The additional following table shows the information which is read out from a memory module, and written as previously mentioned, when such module is addressed with the same addresses used for the test code writing.

| Address | Module Capacity | | | |
|---|---|---|---|---|
| | 0 | 64K | 128K | 256K |
| 0 | $(00)_1$ | C A | $(C)_4 A$ | A A |
| 64K | 0 0 | $(C O)_2$ | B B | B B |
| 128K | 0 0 | C O | $C(0)_3$ | C C |

Figure 7:
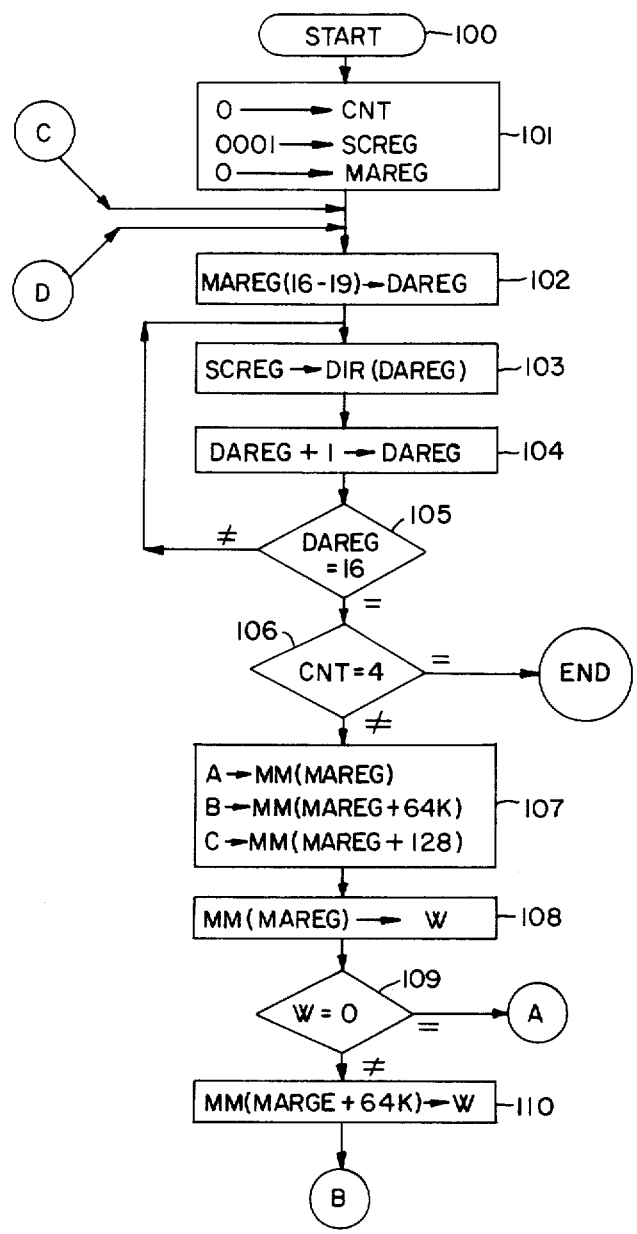
FIGS. 7 and 8 are a logic flow diagram of a program in accordance with the method of the invention.
Figure 8:
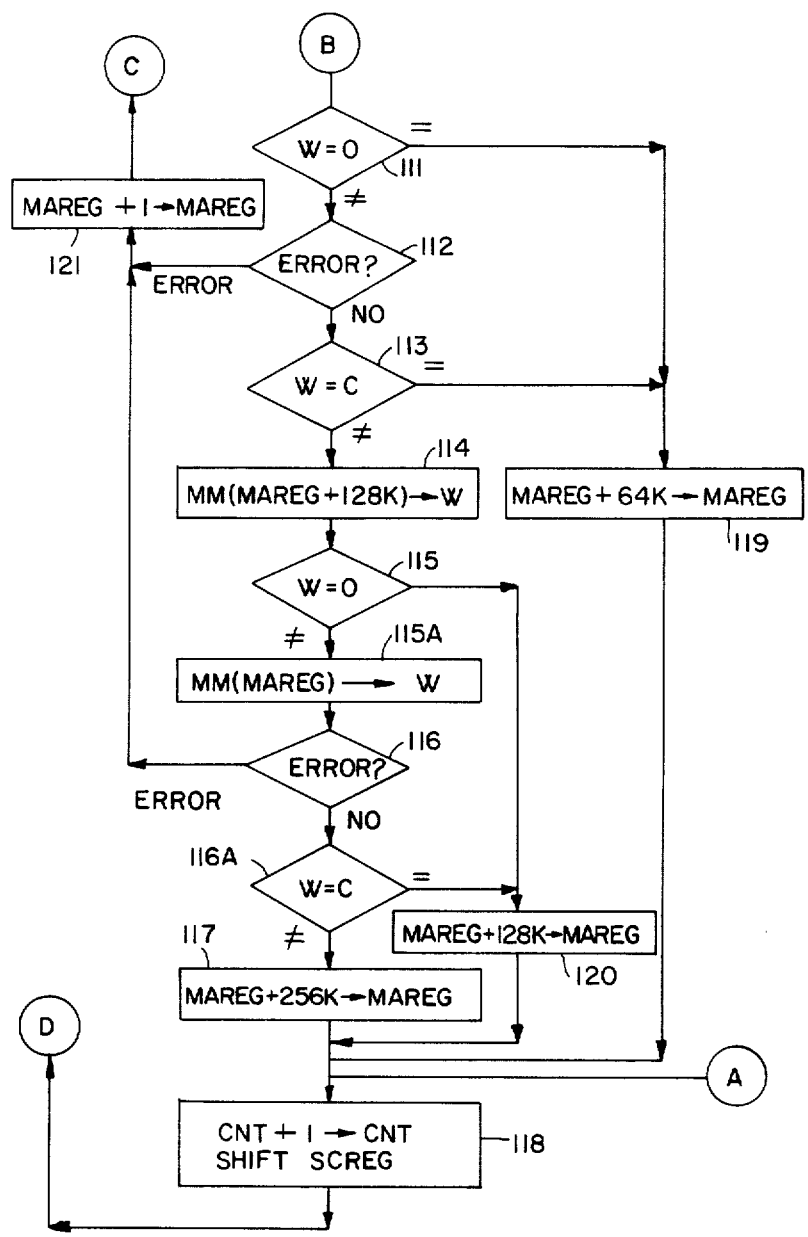

In the case of a module without any possibility of overwriting, when a missing location is addressed, the read information is 0. In the case of a module with overwriting, the reading of a missing location is led back to the reading of the present location which differs from the missing one in the most significant bit or bits. By examining, in order, the content of the addressed locations, it is possible to obtain information about the hypothetical module. More precisely, if the information read out from module location of address 0 is 0, the module is missing; if on the other hand it is different from 0, the module is present. Once this has been ascertained, the content of the module location of address 64K can be read out. If the information read is 0 or C, the module capacity is 64K; if on the other hand it is different from 0 or C, the module capacity is greater than 64K. Therefore the content of module location of address 128K is read out under the following conditions. If the information read is 0, the module capacity is 128K (with regard to module overwriting); if on the other hand it is different from 0 the module may have a capacity of 128K (with regard to module with overwriting) or a greater capacity, that is 256K. Then the content of module location of address 0 is read out. If the information read is C, the module capacity is 128K. The conditions which are checked in order are marked in the above additional table with numbers 1, 2, 3, 4 respectively. It is clear from these preliminary remarks that the method of the invention can be developed by means of a program or microprogram whose flow diagram is shown in FIGS. 7, 8. Such Figures contain the words CNT (counter) SCREG (selecting register), MAREG (memory addressing register), DAREG (directory addressing register) which are indicative of some registers of central unit 1 which are used during the memory mapping method.

Starting from a diagram block START 100 identifying the start of the mapping method, the central unit resets its internal register CNT, loads its internal register SCREG with a code 0001 devoted to select memory module MO and its internal register MAREG with an address 0 devoted to select the first location of the first memory block of capacity 64K words (diagram block 101). After having transferred the content of MAREG related to addressing bits 16–19 into DA REG (diagram block 102), the central unit writes the content of SCREG into the directory location DIR specified by the content of DAREG (diagram block 103). Thereafter the central unit increments by one unit the content of DA REG (diagram block 104) and checks if such content is equal to 16 (expressed in binary code); that is, to the maximum foreseeable number of memory blocks (diagram block 105). In the negative case, the central unit cyclically repeats the operations described by diagram blocks 103, 104, 105. In the positive case, the central unit checks if the content of register CNT is equal to 4 (diagram block 106). In the negative case the central unit writes a test code A, B, C, into memory locations addressed by the contents of MAREG, by the contents of MAREG + 64K and by the contents of MAREG + 128K respectively (diagram block 107). Then the central unit reads the memory location addressed by the contents of MAREG and loads a register W with the read information (diagram block 108). Then it verifies if such read information is equal to 0 (diagram block 109). If such information is equal to 0, this indicates that the memory block is missing; that is, the selected module is missing. In such a case the program jumps to diagram block 118 (FIG. 8). If $W \neq 0$, this means that the selected module is present. Therefore the central unit executes a reading operation at memory address MAREG + 64K and loads register W with the read information (diagram block 110). Then it verifies if such read information is equal to 0 (diagram block 111). If W = 0, this means that the selected module has a capacity of 64K (and is such that overwriting does not occur) and the program jumps to diagram block 119. If W = 0, the central unit checks if the read information is equal to or different from C. Before going on, the central unit suitably verifies that the read information is not affected by a parity error (diagram block 112). This error could be due to a defect or damage of the addressed memory location. It is to be noted that the error checking follows in the flow diagram the condition $W \neq 0$ and therefore it is not executed in case W = 0. In fact it is clear that, if the module or the module location is missing, information 0 is read and also possible parity bits are null; this would lead to an error indication which must be neglected. In case of error, the program jumps to diagram block 121; that is, the content of MAREG is incremented by one unit, and then returns to diagram block 102. In other words the already described routine is repeated by using a different memory location. If error is not present, the central unit verifies if W = C (diagram block 113). If W = C, this again indicates that the selected module has capacity 64K and overwriting occurred. In such a case the central unit jumps to diagram block 119. If $W \neq C$, the central unit reads the memory location of address MAREG + 128K and loads register W with the read information (diagram block 114). If the information read is equal to 0, the selected module has capacity 128K and the program jumps to diagram block 120. If the information read is different from 0, the central unit reads the memory location of address MAREG (diagram block 115A) and verifies that the related information is not affected with error for the already recited reasons (diagram block 116). In case of error, the central unit jumps to diagram block 121. If error is not present it checks if W = C (diagram block 116A). If W = C, the selected module has capacity 128K and the central unit jumps to diagram block 120. The module capacity is 256K. The central unit therefore increments the content of MAREG by 256K (diagram block 117), then increments by one unit the content of CNT and shifts left the contents of SCREG (diagram block 118). At this point the program returns to the operation indicated by block 102 on the diagram. In other words, after having loaded all the directory locations with a code 0001 (content of SCREG), after having selected the first module and written into locations of addresses 0, 64K 128K codes A, B, C, after having read again the same module locations, once established that the module capacity is 256K, SCREG is loaded with a code 0010 and MAREG is loaded with address 256K. The previous operations are then repeated; that is, all the directory locations, except the first four, are loaded with code 0010, the second module is selected, codes A, B, C are written into and again read out from memory locations of absolute addresses 256K, 256K+64K, 256K+128K, and the capacity of the second module is determined. If the capacity of the first module is 0, the previously mentioned operations are repeated, but the writing and reading operations are again performed on locations of absolute addresses 0, 64K, 128K. In fact the central unit directly jumps from diagram block 109 to diagram block 118. If the capacity of the first module is 64K or 128K, MAREG is incremented by 64K or by 128K respectively (diagram blocks 119, 120). Owing to four program cycles, the directory mapping as regards the capacity of the installed memory modules is completed. At the end of the fourth cycle (diagram block 118) the content of register CNT is equal to 4 and the content of register SCREG is 0000 because bit 1 at first present in the module selection code, is now no longer in register SCREG. The execution of the routine described by diagram blocks 102 . . . 105 therefore leads to write code 0000 into directory locations which in case remain. The checking of the performed counting operations (diagram block 106) puts an end to the mapping program.

It is clear that the described program is only a preferred embodiment of the method of the present invention. Numerous modifications can be introduced without departing from the spirit of the invention. For example, in case the memory modules only are of the type such as overwriting is avoided, the program can be considerably simplified and only a test code can be used. Besides, instead of different test codes, a test code only can be used if such code is written into and again read out from memory locations whose addresses differ from each other not only for the most significant bits but also for one or several less significant bits. Once disclosed the basic concepts of the method of the invention, the research of programs alternative to the described one for implementing the method of the invention is obvious and therefore it is omitted.

What is claimed is:

1. A memory mapping method in a data processing system wherein the memory comprises a variable number of modules (MO, M1, M2, M3) up to a maximum of P modules, each module including a plurality of addressable locations whose number may very by multiples of a basic capacity so that said memory may be considered as comprised of a variable number of addressable locations partitioned in a plurality of memory blocks, whose number may range up to a maximum number of possible blocks, each memory block having a number of locations equal to said basic capacity, each of said memory blocks belonging to one of said modules, said modules comprising a number of memory blocks which may differ from module to module, the addressing of a memory location involving the selection of the module containing said location by a directory having a number of addressable locations at least equal to said maximum number of said possible blocks, each directory location being related to a possible block and loaded with a binary code identifying the one of said modules to which the related block belongs, said binary code, when read out, generating a signal selecting the pertinent module, characterized in that the method comprises the following steps:

(a) storing into said directory locations a first binary code identifying a first module as the module to which the related possible block belongs;

(b) storing of test codes into predetermined memory locations each belonging to a different possible block;

(c) reading out the contents of said predetermined locations to determine by comparison of said contents with at least one of said test codes whether or not said predetermined locations and the related blocks are present and belong to said first module;

(d) storing a second binary code into the directory locations related to the possible blocks not belonging to said first module;

(e) storing of test codes into a set of predetermined memory locations, each belonging to a different possible block of said blocks not belonging to said first module;

(f) checking by reading said predetermined locations of said set and by comparison of their contents with at least one of said test codes whether or not said predetermined locations and the pertinent blocks are present and belong to said second module;

(g) repeating in successive order steps (d), (e), (f), for all the subsequent P-2 modules; and (h) storing into directory locations related to possible blocks identified as not belonging to any module of a binary code, which when read, generates an overflow signal.

* * * * *